US008092058B2

(12) United States Patent
Tatsukawa

(10) Patent No.: US 8,092,058 B2
(45) Date of Patent: Jan. 10, 2012

(54) VEHICLE LAMP UNIT

(75) Inventor: Masashi Tatsukawa, Shizuoka (JP)

(73) Assignee: Koito Manufacturing Co., Ltd., Tokyo (JP)

(*) Notice: Subject to any disclaimer, the term of this patent is extended or adjusted under 35 U.S.C. 154(b) by 239 days.

(21) Appl. No.: 12/544,826

(22) Filed: Aug. 20, 2009

(65) Prior Publication Data

US 2010/0046244 A1 Feb. 25, 2010

(30) Foreign Application Priority Data

Aug. 21, 2008 (JP) ................................ 2008-212900

(51) Int. Cl.
*B60Q 1/04* (2006.01)
*F21V 11/00* (2006.01)

(52) U.S. Cl. ......................... 362/539; 362/538; 362/328

(58) Field of Classification Search .................. 362/538, 362/539, 516, 520, 307, 308, 311.02, 328, 362/329
See application file for complete search history.

(56) References Cited

U.S. PATENT DOCUMENTS 6,951,416 B2 * 10/2005 Sazuka et al. ................ 362/538
7,097,334 B2 * 8/2006 Ishida et al. .................. 362/516
7,387,416 B2 * 6/2008 Tsukamoto et al. .......... 362/518
2007/0171650 A1 7/2007 Ishida
2007/0201241 A1 * 8/2007 Komatsu ...................... 362/545

FOREIGN PATENT DOCUMENTS

EP 1 357 333 A2 10/2003
JP 2003-317513 A 11/2003

OTHER PUBLICATIONS

Extended European Search Report issued in European Application No. 09010733.5-1268 dated Dec. 7, 2009, 7 pages.

* cited by examiner

*Primary Examiner* — Thomas Sember
(74) *Attorney, Agent, or Firm* — Osha • Liang LLP

(57) ABSTRACT

There is provided a vehicle lamp unit. The vehicle lamp includes: a projection lens disposed on an optical axis extending in a vehicle longitudinal direction; a semiconductor light emitting element comprising a light emitting surface having an almost rectangular shape and disposed behind a rear focal point of the projection lens such that a long side of the light emitting surface is substantially perpendicular to the optical axis; and a reflector comprising a reflection surface having an almost oval shape. A first focal point of the reflector is located on the rear focal point of the projection lens, and a second focal point of the reflector is located on the semiconductor light emitting element, and a minimum distance between the reflection surface and a rear corner portion of the light emitting surface is in a range of about 0.3 millimeters (mm) to about 3 mm.

4 Claims, 3 Drawing Sheets

VEHICLE LAMP UNIT

CROSS-REFERENCE TO RELATED APPLICATIONS

This application claims priority from Japanese Patent Application No. 2008-212900, filed on Aug. 21, 2008, the entire contents of which are herein incorporated by reference.

BACKGROUND OF INVENTION

1. Field of the Invention

The present disclosure relates to a vehicle lamp unit which is used in a so-called projector-type vehicle lamp.

2. Related Art

Among vehicle lamps, such as a head lamp, a so-called projector-type vehicle lamp is known as one of various types of vehicle lamps. In the projector-type vehicle lamp, light emitted from a light source disposed on an optical axis is collected and reflected by a reflector in a forward direction toward the optical axis and the reflected light is irradiated to a region in front of the lamp via a projection lens provided in front of the reflector.

In the projector-type vehicle lamp unit, a discharge light emitting portion of a discharge bulb, a filament of a halogen lamp, or the like is used as the light source. However, because the light source is a line light source having a certain size, the reflector is also required to have a certain size. For this reason, it is difficult to remarkably decrease the size of the lamp unit. Therefore, for example, JP-A-2003-317513 discloses a semiconductor light emitting element (LED), which corresponds to a small light source, used as a light source unit for the vehicle lamp.

In the light source unit disclosed in JP-A-2003-317513, because the reflector is formed such that a distance between the semiconductor light emitting element and the reflection surface in a given direction (a given direction substantially perpendicular to the optical axis) is set to about 10 millimeters (mm), a remarkably further decrease in the size of the lamp cannot be achieved.

SUMMARY OF INVENTION

One or more embodiments of the present invention provide a vehicle lamp unit capable of remarkably decreasing a size of a lamp.

According to one or more aspects of one or more embodiments of the present invention, there is provided a vehicle lamp unit. The vehicle lamp comprises: a projection lens disposed on an optical axis extending in a vehicle longitudinal direction; a semiconductor light emitting element comprising a light emitting surface having an almost rectangular shape and disposed behind a rear focal point of the projection lens such that a long side of the light emitting surface is substantially perpendicular to the optical axis; and a reflector comprising a reflection surface having an almost oval shape. A first focal point of the reflector is located on the rear focal point of the projection lens, and a second focal point of the reflector is located on the semiconductor light emitting element, and a minimum distance between the reflection surface and a rear corner portion of the light emitting surface is in a range of about 0.3 millimeters (mm) to about 3 mm.

Other aspects and advantages of the present invention will be apparent from the following description, the drawings, and the claims.

DETAILED DESCRIPTION

Hereinafter, a vehicle lamp unit according to exemplary embodiments of the invention will be described in detail with reference to the accompanying drawings.

Figure 1:
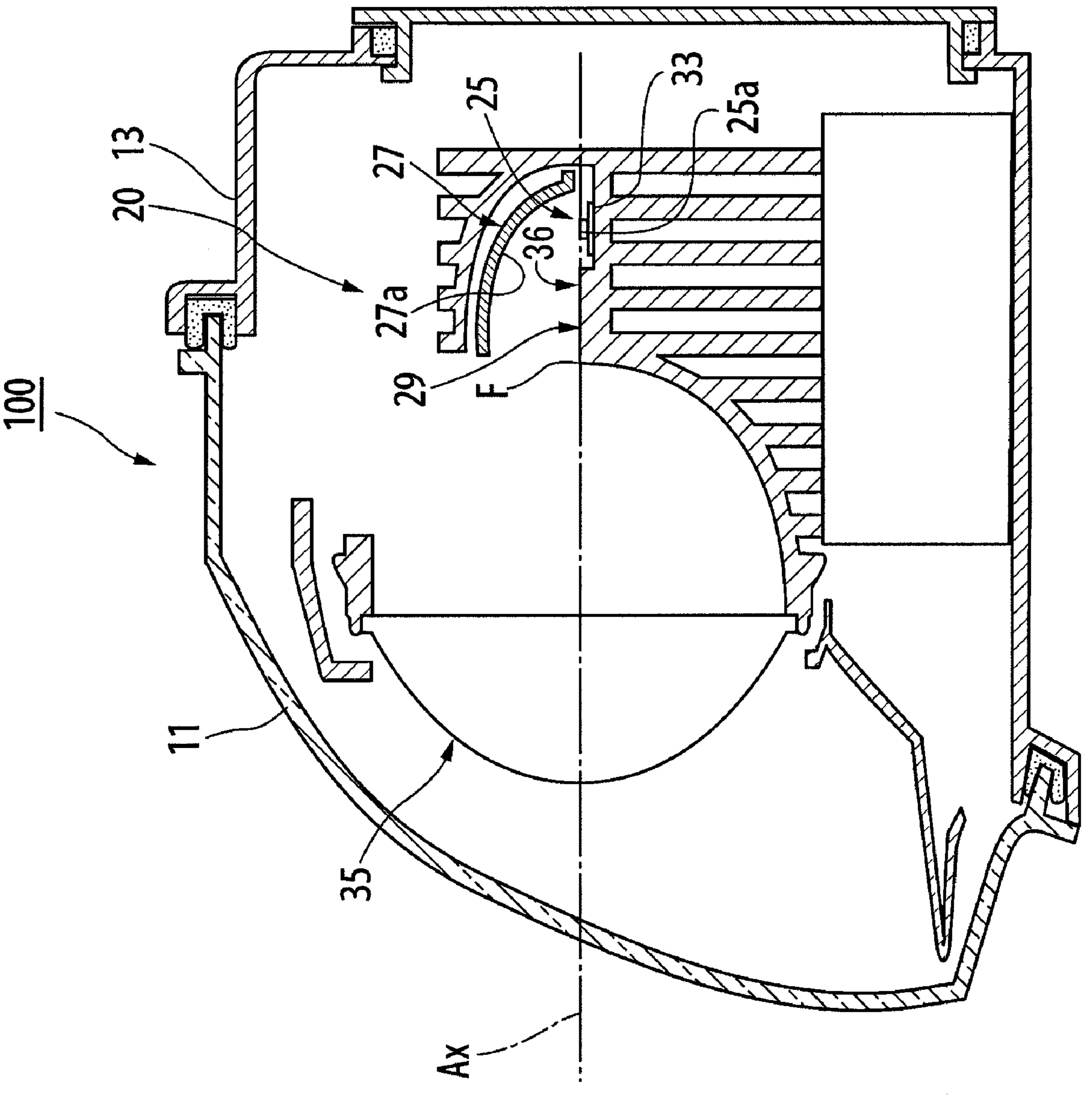
FIG. 1 is a longitudinal sectional view showing a vehicle lamp provided with a vehicle lamp unit according to an exemplary embodiment of the invention.
Figure 2:
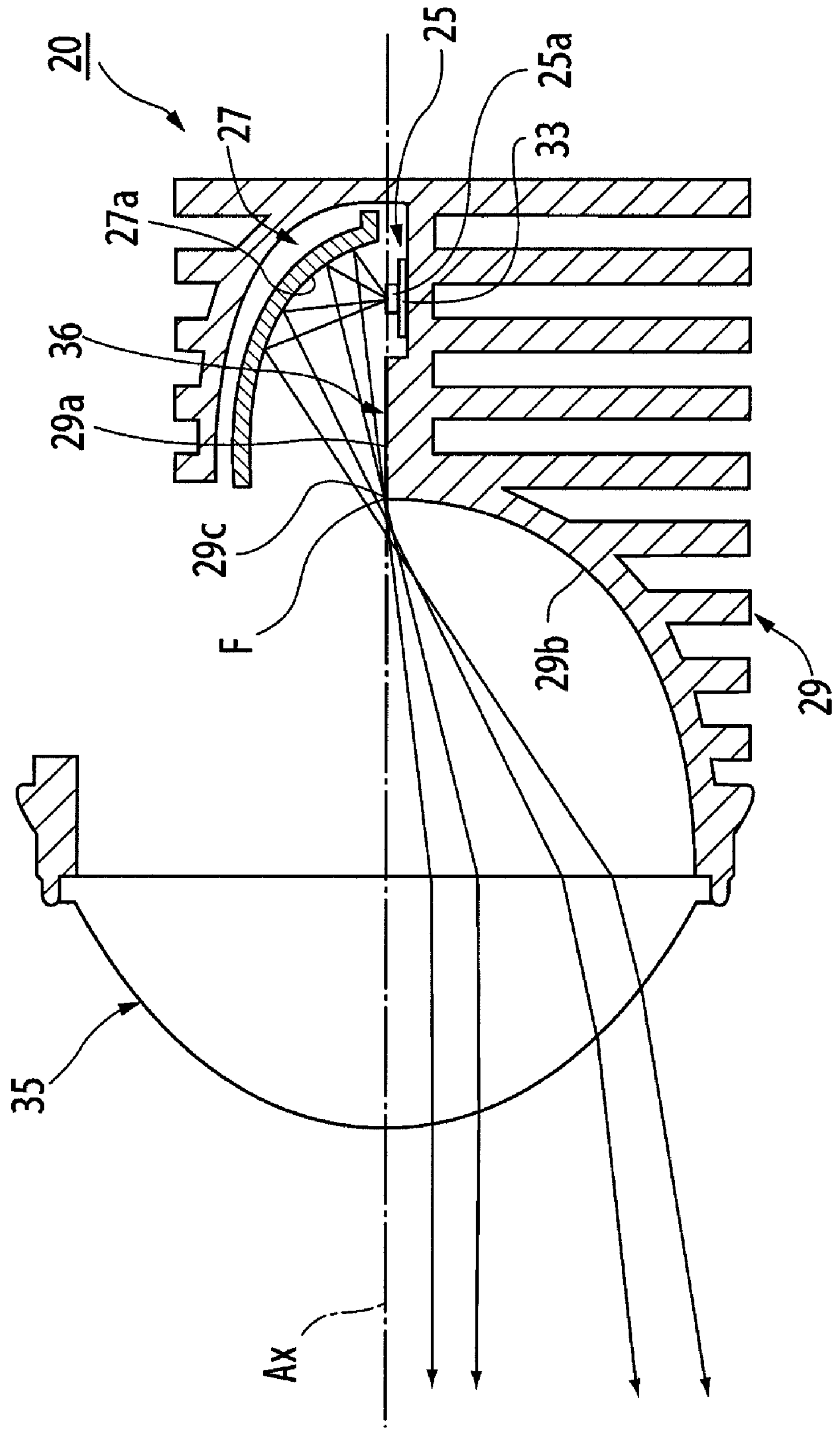
FIG. 2 is a longitudinal sectional view showing a basic configuration of the vehicle lamp unit shown in FIG. 1.
Figure 3:
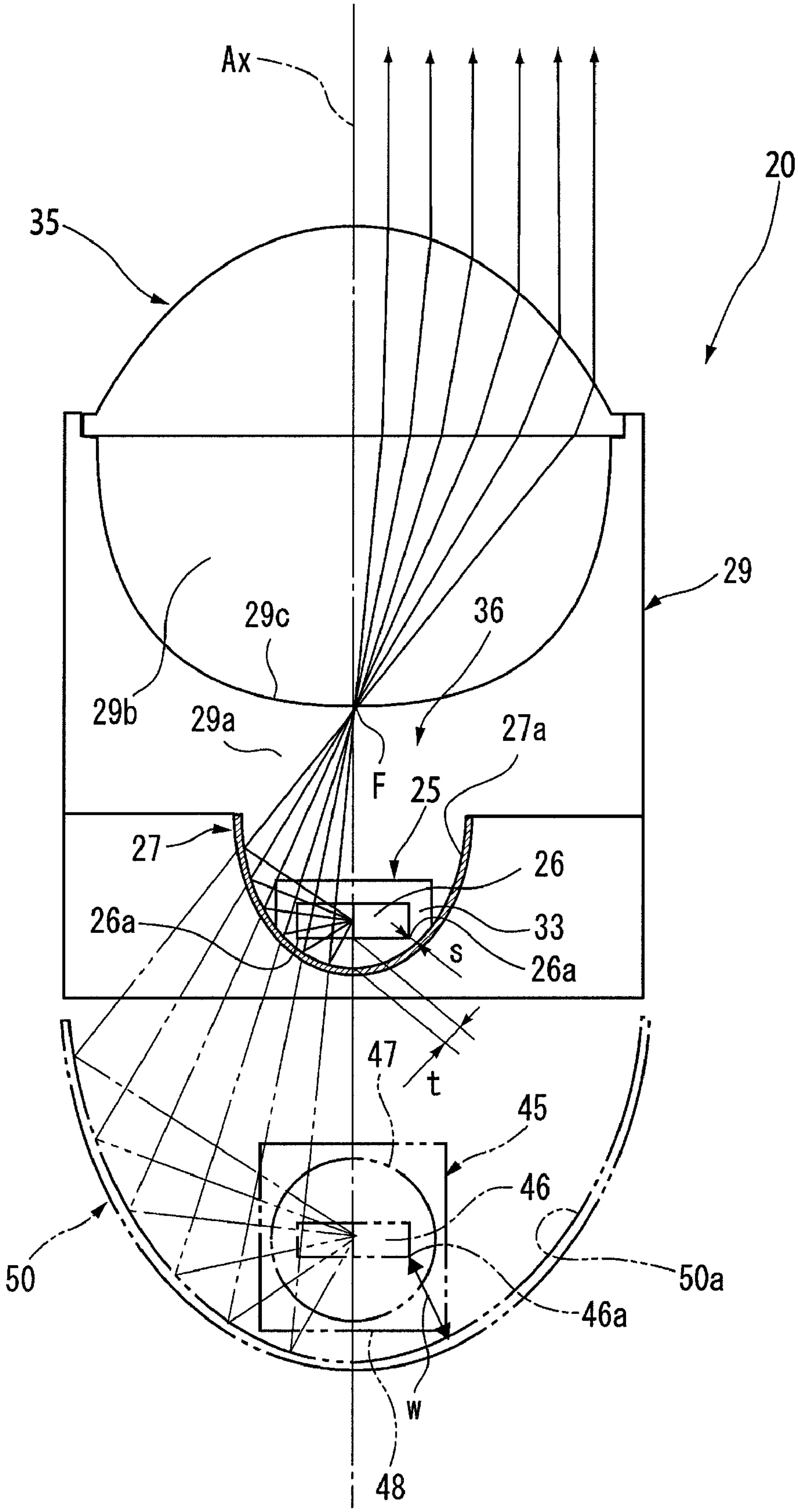
FIG. 3 is a horizontal sectional view showing a main part of the vehicle lamp unit shown in FIG. 2.

FIG. 1 is a longitudinal sectional view showing a vehicle lamp provided with a vehicle lamp unit according to an embodiment of the invention. FIG. 2 is a longitudinal sectional view showing a basic configuration of the vehicle lamp unit shown in FIG. 1. FIG. 3 is a horizontal sectional view showing a main part of the vehicle lamp unit shown in FIG. 2.

As shown in FIG. 1, a vehicle lamp unit 100 according to one or more embodiments is a low-beam headlamp, and has a structure in which a lamp unit (vehicle lamp unit) 20 is accommodated in a lamp chamber formed by a lamp body 13 and a transparent light transmitting cover 11.

The lamp unit 20 is disposed such that an optical axis Ax thereof extends in a vehicle longitudinal direction. Specifically, the optical axis Ax of the lamp unit 20 extends in a direction tilted downward by about 0.5 to 0.6° with respect to a horizontal direction.

In addition, as described below, the lamp unit 20 used to form a low-beam light distribution pattern is formed as a projector-type lamp unit and includes a Light Emitting Diode (LED) 25, which is a semiconductor light emitting element as a light source, and a projection lens 35, which is provided in front of the LED 25.

As shown in FIGS. 2 and 3, the lamp unit 20 according to one or more embodiments includes: the projection lens 35, which is disposed on the optical axis Ax extending in the vehicle longitudinal direction; the LED 25, which is disposed in rear of a rear focal point F of the projection lens 35 such that a long side of a light emitting surface 26 having a rectangular shape is substantially perpendicular to the optical axis Ax; a reflector 27, which includes a reflection surface 27*a* formed in a substantially oval shape such that the rear focal point F of the projection lens 35 is set to a first focal point and the LED 25 is set to a second focal point; and a shade 29, which is disposed between the projection lens 35 and the LED 25 and shields a part of light reflected by the reflector 27 so as to form a cutoff line of a light distribution pattern.

In addition, the lamp unit 20 is supported by the lamp body 13 via a frame (not shown), and the frame is supported by the lamp body 13 via an aiming mechanism (not shown).

As shown in FIG. 3, the LED 25 is a white light emitting LED in which a light emitting chip has, for example, a rectangular light emitting surface 26 of 1×4 millimeters (mm). The LED 25 is disposed in rear of the rear focal point F of the projection lens 35 and is supported by a substrate 33 so as to face upward in a direction perpendicular to the optical axis Ax. In addition, the LED 25 does not include a cover member such as a cover lens which covers the light emitting surface 26.

The reflector 27 is a substantially dome-shaped member, which is provided on the upper side of the LED 25. The reflector 27 includes a reflection surface 27*a*, which collects and reflects light emitted from the LED 25 in a forward direction toward the optical axis Ax.

In addition, according to one or more embodiments, a minimum distance s between the reflection surface 27*a* of the reflector 27 and a rear corner portion 26*a* of the rectangular outer periphery of the light emitting surface 26 of the LED 25 is set to about 1 mm.

The reflection surface 27*a* is formed in a substantially oval spherical surface shape with the optical axis Ax serving as a central axis. In detail, the reflection surface 27*a* is set such that the cross-sectional shape including the optical axis Ax is formed in a substantially oval shape and the eccentricity thereof gradually increases from a perpendicular section toward a horizontal section.

However, the rear focal points of the ovals forming the sections are set to the same position, and the LED 25 is disposed at the first focal point of the oval forming the perpendicular section of the reflection surface 27*a*. Accordingly, the reflection surface 27*a* collects and reflects the light emitted from the LED 25 in the forward direction toward the optical axis Ax. In the perpendicular section including the optical axis Ax, the light is allowed to be substantially converged at the second focal point of the oval.

The projection lens 35 is formed as a plane-convex lens whose front surface is a convex surface and whose rear surface is a flat surface. As shown in FIG. 2, the projection lens 35 has a structure in which the rear focal point F is disposed on the optical axis Ax so as to be located at the second focal point of the reflection surface 27*a* of the reflector 27. Accordingly, an image formed on a focal point surface including the rear focal point F is projected in the forward direction as an inverse image.

The shade 29 according to one or more embodiments is formed in a block (lump) shape so as to be simultaneously used as a holder for the projection lens 35, the reflector 27, and the LED 25. The shade 29 is disposed between the projection lens 35 and the LED 25. In addition, the shade 29 forms a cutoff line of a light distribution pattern in such a manner that a light shielding edge 29*c* is located in the vicinity of the rear focal point F of the projection lens 35 so as to shield a part of light reflected by the reflector 27.

Further, in the shade 29, an upper surface 29*a* extending backward in the direction of the optical axis Ax from the light shielding edge 29*c* reflects upward a part of light reflected by the reflector 27. The upper surface 29*a* is provided with an auxiliary reflection surface 36 subjected to a reflection surface process.

That is, the shade 29 is formed such that the light shielding edge 29*c* (i.e., a ridge between the auxiliary reflection surface 36 and a front end surface 29*b* of the shade 29) passes through the rear focal point F of the projection lens 35.

In addition, when a part of light reflected by the reflector 27 is reflected upward by the auxiliary reflection surface 36, it is possible to efficiently use the light shielded by the shade 29 as irradiation light. Thus, the light flux availability of the light emitted from the LED 25 is improved.

Further, the light shielding edge 29*c* of the shade 29 is formed in a curved shape, in which both left and right sides thereof protrude forward in a top view, so as to correspond to the curvature of the image surface of the projection lens 35. The curved light shielding edge 29*c* aligns with a focal point group of the projection lens 35. That is, the shade 29 has a structure in which the light shielding edge 29*c* is formed along the focal point group of the projection lens 35, and the shape of the light shielding edge 29*c* is directly used as the shape of the cutoff line.

As described above, in the lamp unit 20 according to one or more embodiments, the minimum distance s between the reflection surface 27*a* of the reflector 27 and the rear corner portion 26*a* of the rectangular outer periphery of the light emitting surface 26 of the LED 25 is set to about 1 mm.

Thus, it is possible to remarkably decrease the size of the reflector 27 of the lamp unit 20 as compared with a reflector 50 which is the known projector-type vehicle lamp unit depicted by the imaginary line (two point dashed line) in FIG. 3. In the reflector 50, a minimum distance w between a reflection surface 50*a* of a reflector 50 and a rear corner portion 46*a* of a rectangular outer periphery of a light emitting surface 46 of an LED 45 is set to about 5.65 mm.

Because the LED 25 is used as the light source in the lamp unit 20, it is possible to decrease the size of the reflector 27 without considering the influence of heating. In addition, because the LED 25 does not include a cover member, which covers the light emitting surface 25*a*, it is not necessary to worry about the cover member contacting the reflection surface of the reflector. Accordingly, it is possible to easily dispose the reflection surface 27*a* of the reflector 27 adjacent to the light emitting surface 25*a* of the LED 25.

That is, in the LED 45 of the known vehicle lamp unit, as shown in FIG. 3, the size of the light emitting surface 46 itself is substantially the same as the light emitting surface 26 of the LED 25 according to one or more embodiments of the present invention. However, because the light emitting surface 46 is covered by a semi-spherical cover lens 47 as a cover member, the cover lens 47 contacts with the reflection surface 50*a* of the reflector 50 if the minimum distance w between the reflection surface 50*a* and the corner portion 46*a* of the LED 45 is set to be less than or equal to the minimum distance s of the lamp unit 20 according to one or more embodiments of the present invention.

Further, it is advantageous that the minimum distance s between the reflection surface 27*a* of the reflector 27 and the rear corner portion 26*a* of the rectangular outer periphery of the light emitting surface 26 of the LED 25 be in the range of about 0.3 mm to about 3 mm. That is, in the case where the minimum distance s is less than 0.3 mm, because the assembling tolerance between the LED 25 and the reflector 27 is too small, a higher precision of the component is required and the assembling operation deteriorates. Accordingly, manufacturing costs may increase. In addition, in the case where the minimum distance s is larger than 3 mm, the reflector 27 may not be remarkably decreased in size as compared with the known reflector 50 in accordance with the size or shape of the light emitting surface 26 of the LED 25.

Further, in the case where the size of the light emitting surface 26 is larger than the size of 0.5×0.5 mm, as in the LED 25 of the lamp unit 20 according to one or more embodiments of the present invention, it is possible to easily decrease the size of the reflector 27 in such a manner that the reflection surface 27*a* of the reflector 27 is formed such that a minimum distance t is 5 mm or less, where the minimum distance t is a distance between the reflection surface 27*a* and the long rear side of the light emitting surface 26 and is substantially equal to a focal point distance between the reflection surface 27*a* and the second focal point.

That is, in the case where the size of the light emitting surface 26 is larger than the size of 0.5 mm×0.5 mm, when the reflection surface 27*a* of the reflector 27 is set such that the minimum distance t between the reflection surface 27*a* and the rear long side of the light emitting surface 26 is 5 mm or less, it is possible to improve the degree of freedom in design of the lamp unit 20 and to improve the assembling operation compared with the case where the minimum distance s between the reflection surface 27*a* of the reflector 27 and the corner portion 26*a* of the LED 25 is set in a range of about 0.3 mm to about 3 mm. As a result, it is possible to easily manufacture the lamp unit 20.

Accordingly, in the lamp unit 20 according to one or more embodiments of the present invention, it is possible to remarkably decrease the size of the reflector 27 compared with the reflector 50 which is the known projector-type vehicle lamp unit. Thus, when the lamp unit 20 according to one or more embodiments is used for the vehicle lamp 100, it is possible to remarkably decrease the size of the vehicle lamp 100.

Furthermore, in the lamp unit 20 according to one or more embodiments of the present invention, because the shade 29 is simultaneously used as the holder for the projection lens 35, the reflector 27, and the LED 25, it is possible to very precisely set the positional relationship of the projection lens 35, the reflector 27, the shade 29, and the LED 25 in the step before assembling the vehicle lamp 100. Accordingly, it is possible to easily assemble the vehicle lamp 100.

According to one or more aspects of one or more embodiments of the present invention, a vehicle lamp unit includes: a projection lens, which is disposed on an optical axis extending in a vehicle longitudinal direction; a semiconductor light emitting element including a light emitting surface having an almost rectangular shape and disposed behind a rear focal point of the projection lens such that a long side of the light emitting surface is substantially perpendicular to the optical axis; and a reflector including a reflection surface having an almost oval shape. A first focal point of the reflector is located on the rear focal point of the projection lens and a second focal point of the reflector is located on the semiconductor light emitting element. A minimum distance between the reflection surface and a rear corner portion of the light emitting surface is in a range of about 0.3 mm to about 3 mm.

According to the above-described vehicle lamp unit, because the reflection surface of the reflector is formed such that the minimum distance between the reflection surface and the rear corner portion of the light emitting surface is in a range of about 0.3 mm to about 3 mm, it is possible to remarkably decrease the size of the reflector as compared with the reflector which is the known projector-type vehicle lamp unit. Because the semiconductor light emitting element is used as the light source, it is possible to decrease the size of the reflector without considering the influence of heating.

Also, the semiconductor light emitting unit may not comprise a cover member which covers the light emitting surface.

According to the above-described vehicle lamp unit, because it not necessary to worry about the cover member of the semiconductor light emitting element contacting the reflection surface of the reflector, it is possible to easily dispose the reflection surface of the reflector to be adjacent to the light emitting surface of the semiconductor light emitting element.

Also, the light emitting surface may be formed in a rectangular shape which is larger than a rectangular shape of 0.5 mm×0.5 mm, and a minimum distance between the reflection surface and a rear long side of the light emitting surface may be 5 mm or less.

According to the above-described vehicle lamp unit, it is possible to easily decrease the size of the reflector. That is, it is possible to improve the degree of freedom in design of the vehicle lamp unit and to improve the assembling operation.

Also, the vehicle lamp unit may further include: a shade which is disposed between the projection lens and the semiconductor light emitting element so as to form a cutoff line of a light distribution pattern by shielding a part of light reflected by the reflector.

According to the above vehicle lamp unit, for example, it is possible to form the light distribution pattern having the cut-off line such as a low-beam light distribution pattern of a head lamp.

Further, when an auxiliary reflection surface is formed to extend backward in the optical axis direction from a light shielding edge of the shade, and a part of light reflected by the reflection surface is reflected upward by the auxiliary reflection surface, it is possible to efficiently use the light shielded by the shade as irradiation light. Thus, the light flux availability of the light emitted from the semiconductor light emitting element is improved.

While the present invention has been shown and described with reference to certain exemplary embodiments thereof, other implementations are within the scope of the claims. It will be understood by those skilled in the art that various changes in form and details may be made therein without departing from the spirit and scope of the invention as defined by the appended claims.

For example, in the above-described embodiments, the vehicle lamp unit is used as the low-beam head lamp. However, the shade may be omitted or plural pairs of reflectors and light emitting elements may be used in combination so that the vehicle lamp unit can be used as various vehicle lamp units, such as a fog lamp or a bending lamp. Even in such cases, it is possible to obtain the same advantages as those of the above-described embodiments. Further, the semiconductor light emitting element used as the light source is not limited to a light emitting diode. Instead, a semiconductor laser (LD) or the like may be employed in place of the light emitting diode while still obtaining the same advantages as those of the above-described embodiments.

The invention claimed is:

1. A vehicle lamp unit comprising:

a projection lens disposed on an optical axis extending in a vehicle longitudinal direction;

a semiconductor light emitting element comprising a light emitting surface having an almost rectangular shape and disposed behind a rear focal point of the projection lens such that a long side of the light emitting surface is substantially perpendicular to the optical axis; and a reflector comprising a reflection surface having an almost oval shape, wherein a first focal point of the reflector is located on the rear focal point of the projection lens, and a second focal point of the reflector is located on the semiconductor light emitting element, and wherein a minimum distance between the reflection surface and a rear corner portion of the light emitting surface is in a range of about 0.3 millimeters (mm) to about 3 mm.

2. The vehicle lamp unit according to claim 1, wherein the semiconductor light emitting unit does not comprise a cover member which covers the light emitting surface.

3. The vehicle lamp unit according to claim 1, wherein the light emitting surface is formed in a rectangular shape, which is larger than 0.5 mm×0.5 mm, and wherein a maximum distance between the reflection surface and a rear long side of the light emitting surface is 5 mm or less.

4. The vehicle lamp unit according to claim 1, further comprising: a shade disposed between the projection lens and the semiconductor light emitting element so as to form a cutoff line of a light distribution pattern by shielding a part of light reflected by the reflector.

* * * * *